United States Patent
Woo et al.

(10) Patent No.: US 8,070,862 B2
(45) Date of Patent: Dec. 6, 2011

(54) DUST COLLECTION DEVICE FOR SANDING TOOL

(75) Inventors: Edward J. Woo, Woodbury, MN (US); Seyed A. Angadjivand, Woodbury, MN (US); Rufus C. Sanders, Jr., Burnsville, MN (US); Edward L. Manor, Lakeland, MN (US); Robert A. Harkins, Savage, MN (US); Ehrich J. Bräunschweig, Woodbury, MN (US); Joseph B. Eckel, Shoreview, MN (US); Timothy J. Rowell, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 322 days.

(21) Appl. No.: 12/180,712

(22) Filed: Jul. 28, 2008

(65) Prior Publication Data
US 2009/0056548 A1    Mar. 5, 2009

Related U.S. Application Data

(60) Provisional application No. 60/969,808, filed on Sep. 4, 2007.

(51) Int. Cl.
*B01D 46/02* (2006.01)
*A47L 9/10* (2006.01)

(52) U.S. Cl. ............... 96/69; 55/382; 55/385.1; 55/486; 55/DIG. 39; 55/DIG. 2

(58) Field of Classification Search ............ 15/347, 15/330, 344, 340.2, 352; 95/57, 78, 287; 96/15, 69; 55/364, 366, DIG. 2, 382, 486, 55/487, 385.1
See application file for complete search history.

(56) References Cited

U.S. PATENT DOCUMENTS

| | | | |
|---|---|---|---|
| 2,804,166 A | | 8/1957 | Stevens et al. |
| 3,676,986 A | * | 7/1972 | Reiling ............ 55/472 |
| 4,215,682 A | | 8/1980 | Kubik et al. |
| RE30,782 E | | 10/1981 | Van Turnhout |
| 4,352,684 A | | 10/1982 | Amberkar |

(Continued)

FOREIGN PATENT DOCUMENTS
EP    1 285 727    2/2003

(Continued)

OTHER PUBLICATIONS

ASTM D257-93, Aug. 1993.

(Continued)

*Primary Examiner* — Duane Smith
*Assistant Examiner* — Minh-Chau Pham
(74) *Attorney, Agent, or Firm* — Scott A. Baum

(57) ABSTRACT

A dust collection device for a sanding tool comprising a bag having a sidewall and a coupler attached to the bag. The sidewall comprising a first filter layer, a second filter layer, and an outer support layer. The first filter layer comprising a plurality of fibrillated electrostatically charged electret fibers forming a nonwoven web; the first filter layer having a total pressure drop between about 0.1 to about 4.0 mm $H_2O$, and the first filter layer having a total basis weight between about 50 to about 450 gram/$m^2$. The second filter layer comprising a melt blown microfiber nonwoven web; the second filter layer having a total pressure drop between about between about 5.5 to about 20.0 mm $H_2O$, and the second filter layer having a total basis weight between about 15 to about 75 grams/$m^2$.

23 Claims, 5 Drawing Sheets

U.S. PATENT DOCUMENTS

| | | | |
|---|---|---|---|
| 4,375,718 A | | 3/1983 | Wadsworth et al. |
| 4,588,537 A | | 5/1986 | Klaase et al. |
| 4,592,815 A | | 6/1986 | Nakao |
| 4,798,850 A | | 1/1989 | Brown |
| 4,917,942 A | | 4/1990 | Winters |
| 5,074,997 A | * | 12/1991 | Riley et al. ............... 96/222 |
| 5,230,800 A | | 7/1993 | Nelson |
| 5,496,507 A | | 3/1996 | Angadjivand et al. |
| 5,507,847 A | * | 4/1996 | George et al. ............... 55/486 |
| 5,647,881 A | * | 7/1997 | Zhang et al. ............... 55/382 |
| 5,792,242 A | | 8/1998 | Haskett |
| 5,908,598 A | | 6/1999 | Rousseau et al. |
| 6,171,369 B1 | * | 1/2001 | Schultink et al. ............... 95/57 |
| 6,183,536 B1 | * | 2/2001 | Schultink et al. ............... 95/57 |
| 6,397,458 B1 | | 6/2002 | Jones et al. |
| 6,398,847 B1 | | 6/2002 | Jones et al. |
| 6,409,806 B1 | | 6/2002 | Jones et al. |
| 6,471,751 B1 | | 10/2002 | Semanderes et al. |
| 6,514,325 B2 | * | 2/2003 | Cox et al. ............... 96/69 |
| 6,562,112 B2 | | 5/2003 | Jones et al. |
| 6,669,761 B2 | * | 12/2003 | Schultheiss et al. ............... 96/66 |
| 6,923,182 B2 | | 8/2005 | Angadjivand et al. |
| 6,988,293 B2 | * | 1/2006 | Ritter ............... 15/347 |
| 2002/0031992 A1 | | 3/2002 | Clowers |
| 2003/0134515 A1 | | 7/2003 | David et al. |
| 2004/0187449 A1 | | 9/2004 | Witter |
| 2007/0066199 A1 | | 3/2007 | Woo et al. |
| 2007/0251198 A1 | | 11/2007 | Witter |

FOREIGN PATENT DOCUMENTS

| | | |
|---|---|---|
| EP | 1 462 179 | 10/2004 |
| EP | 1 477 273 | 11/2004 |
| JP | 59-228920 | 12/1984 |
| JP | 2001-179627 | 7/2001 |
| WO | 95/05232 | 2/1995 |
| WO | 95/05501 | 2/1995 |
| WO | WO 2008/033972 | 3/2008 |

OTHER PUBLICATIONS

ASTM D5736-95 (reapproved 2001), 2001.
ASTM D737, 2008.
Wente, Van A., "Superfine Thermoplastic Fibers", Industrial Engineering Chemistry, vol. 48, pp. 1342 et seq. (1956).
Wente, Van A. et al., "Manufacture of Superfine Organic Fibers", Report No. 4364 of the Naval Research Laboratories, published May 25, 1954.
Product Catalog Item, "3M™ High Efficiency Filter AS-140-25", 3M Company, St. Paul, Minnesota, USA, [retrieved from the internet on Aug. 21, 2008]URL <http://solutions.3m.com/wps/portal/3M/en_US/Health/Safety/Products/Catalog/?PC_7_RJH9U5230GE3E>.

* cited by examiner

DUST COLLECTION DEVICE FOR SANDING TOOL

CROSS-REFERENCE TO RELATED APPLICATION

This application claims the benefit of priority to U.S. Provisional Application No. 60/969,808 entitled Dust Collection Device For Sanding Tool filed on Sep. 4, 2007, the disclosure of which is herein incorporated by reference in its entirety.

BACKGROUND

Sanding tools, such as random orbit sanders, are frequently powered by a pneumatic compressed air supply. Pneumatically powered sanders can be designed to create a self-generated vacuum to capture dust and debris by sending the exhaust air from the pneumatic motor through a venturi in the exhaust air stream to create a suction port. The suction is directed with shielding and porting to the surface of the work piece through utilization of a ventilated abrasive article and back-up pad having a plurality of dust transport holes. The dust laden air stream after the venturi can be directed to a dust capture bag that is attached to the exhaust port (dust exit port) of the sander.

Typically, a cloth or paper capture bag is attached to a vacuum hose connected to the dust exit port, or the bag is attached to the dust exit port directly to filter the exhaust air and to capture the sanding dust and debris. While the cloth dust bag functions to capture some of the dust, frequently very fine particles of dust are not retained inside the cloth dust bag. Additionally, depending on the type and size distribution of the sanding dust, the pores in the cloth bag can be quickly plugged greatly reducing the efficiency of the bag to collect further dust and debris. Once plugged up, the cloth dust bag must be removed, emptied, and cleaned of the residual dust before sanding can continue. Furthermore, once the dust is collected within the cloth bag, the dust can shift in the bag causing a reduction in the ability of the cloth bag to capture further dust. For example, when sanding on a vertical surface the captured dust within the cloth bag may partially block or obstruct the entry port into the cloth bag depending on the orientation of the cloth bag with respect to the force of gravity.

SUMMARY

To enhance the dust collection for sanding tools, what is needed is an improved dust collection device that has improved operating life, improved dust collection ability, or improved dust collection when sanding vertical surfaces. The inventors have determined that by utilizing a dust collection device having at least a three-layer sidewall construction, the capture of fine dust particles is increased, the effective life of the dust collection device is also increased, and improved dust collection while sanding vertical surfaces results.

In one aspect, the invention resides in a dust collection device for a sanding tool comprising a bag having a sidewall and a coupler attached to the bag. The sidewall includes a first filter layer, a second filter layer, and an outer support layer. The first filter layer comprising a plurality of fibers forming a nonwoven web; the first filter layer having a total pressure drop between about 0.1 to about 4.0 mm $H_2O$, and the first filter layer having a total basis weight between about 50 to about 450 gram/m². The second filter layer comprising a melt blown microfiber nonwoven web; the second filter layer having a total pressure drop between about 5.5 to about 20.0 mm $H_2O$, and the second filter layer having a total basis weight between about 15 to about 75 grams/m².

In another aspect, the invention resides in a kit comprising a dust collection device for a sanding tool comprising a bag having a sidewall and a coupler having a barbed first end attached to the bag. The sidewall including a first filter layer, a second filter layer, and an outer support layer. The first filter layer comprising a plurality of fibers forming a nonwoven web; the first filter layer having a total pressure drop between about 0.1 to about 4.0 mm $H_2O$, and the first filter layer having a total basis weight between about 50 to about 450 gram/m². The second filter layer comprising a melt blown microfiber nonwoven web; the second filter layer having a total pressure drop between about 5.5 to about 20.0 mm $H_2O$, and the second filter layer having a total basis weight between about 15 to about 75 grams/m². Included in the kit is an adapter having a first threaded end and a second internally tapered end. Included in the kit are instructions for attaching the first threaded end of the adapter to a dust exit port of the sanding tool and for inserting the barbed first end of the coupler into the second internally tapered end of the adapter.

Another embodiment of the invention resides in a method of collecting dust from a sanding tool comprising attaching the dust collection device to the dust exit port of the sanding tool.

BRIEF DESCRIPTION OF THE DRAWINGS

It is to be understood by one of ordinary skill in the art that the present discussion is a description of exemplary embodiments only, and is not intended as limiting the broader aspects of the present invention, which broader aspects are embodied in the exemplary construction.

Figure 1:
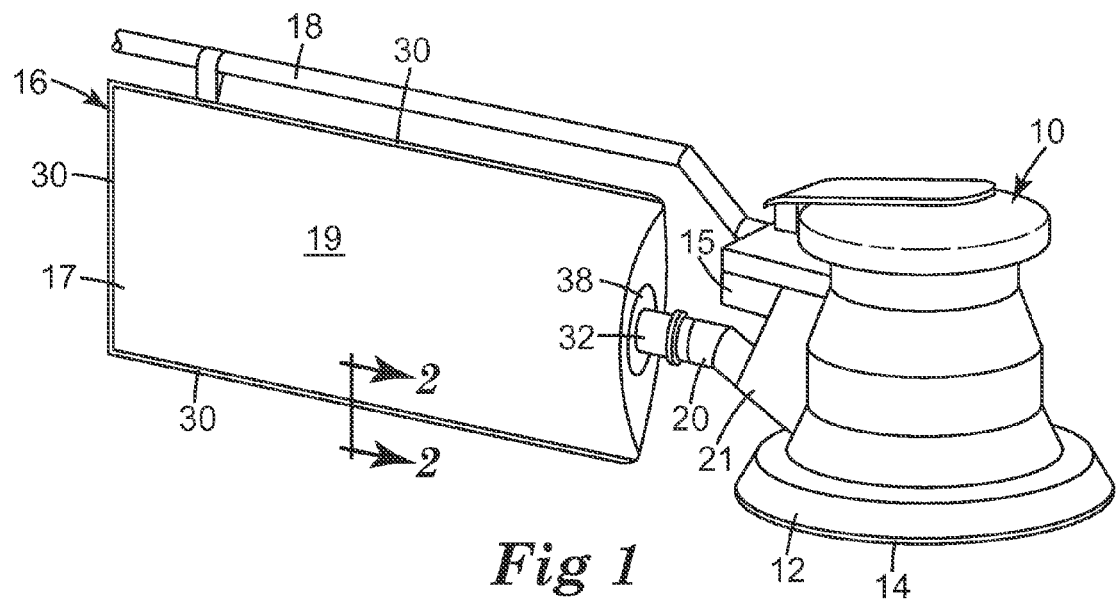
FIG. 1 illustrates a perspective view of a sanding tool with an attached dust collection device.

Repeated use of reference characters in the specification and drawings is intended to represent the same or analogous features or elements of the invention.

DEFINITIONS

As used herein, forms of the words "comprise", "have", and "include" are legally equivalent and open-ended. Therefore, additional non-recited elements, functions, steps or limitations may be present in addition to the recited elements, functions, steps, or limitations.

As used herein "layer" means that the material forming the layer has substantially the same mechanical structure and chemical composition.

As used herein "ply" means an individual separable sheet. For example, a layer of facial tissue often contains two plies of facial tissue material that form the sheet of tissue paper that is dispensed from the carton.

DETAILED DESCRIPTION

Referring to FIG. 1, a sanding tool 10 is illustrated. The sanding tool includes a back-up pad 12 to which an abrasive article 14 is attached. The back-up pad and abrasive article each contains a plurality of holes to enable the movement of dust and debris from the sanding surface to a dust collection device 16 under vacuum action. In one embodiment, the sanding tool 10 comprises a pneumatic random orbit sander that is attachable to a source of compressed air by an air line 18. Within the pneumatic random orbit sander, the compressed air is routed through an air motor that rotates and oscillates the backup pad 12 and the abrasive article 14. At least a portion of the exhaust air of the motor can be routed through a venturi 15 and out a dust exit port 20 into the dust collection device 16. The dust collection device 16 includes a bag portion 17 and a coupler 38 for attaching the dust collection device to the dust exit port 20 of the sanding tool 10 such that the dust collection device is in fluid communication with the dust exit port. Routing the exhaust air through the venturi creates a low pressure zone due to the venturi effect, and the low pressure zone can be connected by a duct 21 to the holes in the back-up pad 12 to create a vacuum adjacent the work piece that sucks the dust and debris into the dust collection device 16.

To quantify the suction of several commercially available pneumatic sanders, the backup pad 12 with dust capture holes was placed into a closed container (one-gallon paint container with a 10.2 cm opening in the top). Vinyl adhesive tape was used to seal off any air leakage between the opening into the container and the bottom of the sander's shroud while ensuring that the backup pad 12 was able to rotate freely within the closed container. A small sealed inlet into the closed container was connected to an air flow meter to measure the volume of air drawn though the backup pad. Four different commercially available sanders were tested at an operating pressure of 90 psig (620 kPa). The maximum self-generated suction through the backup pad was measured to be between about 6.7 cfm (190 liters/min) to about 13.5 cfm (382 liters/min). The air flow meter was then attached to the dust exit port 20 of the pneumatic sander. The total air flow from the dust exit port 20 at 90 psig (620 kPa) was measured to be between about 21 cfm (595 liters/min) to about 29 cfm (821 liters/min) when the pneumatic sanders were operated at 90 psig (620 kPa).

From the above tests, it can be determined that the total airflow though the dust collection device 16 is quite large. Furthermore, the small size of the dust collection device 16 means that the airflow per unit area (e.g., $cfm/ft^2$) through the sidewall 19 of the dust collection device 16 is also quite large. Thus, the dust collection device 16 should allow for high airflows, such as between about 15 to about 35 cfm (425 to 990 liters/min), at pressures of between about 50 to about 90 psig (345 to 620 kPa) without a significant pressure drop, while simultaneously trapping very small particles of dust from a heavily loaded contaminant stream of air picked up from adjacent the work surface during sanding.

Figure 2:
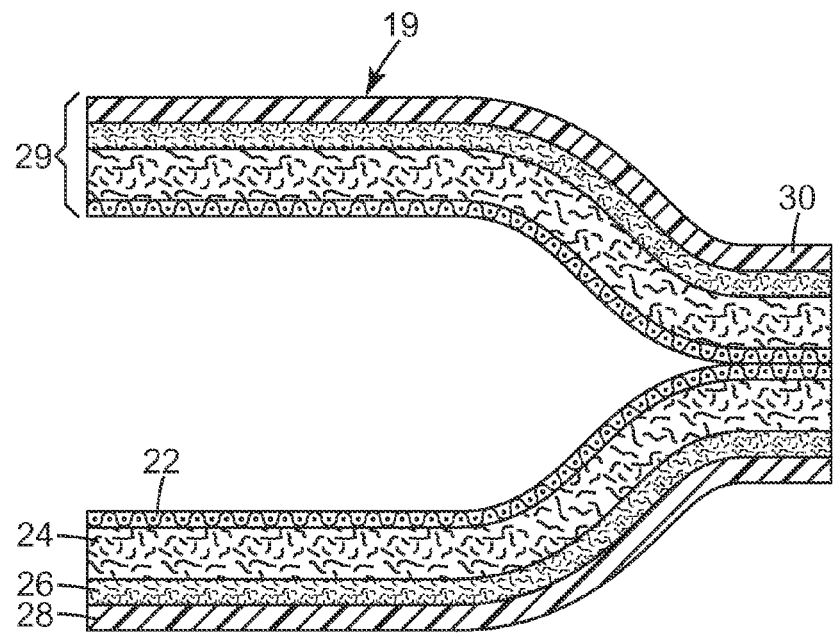
FIG. 2 illustrates a cross section of the sidewall of the duct collection device taken at 2-2 of FIG. 1.

Referring to FIG. 2, a cross section of the dust collection device 16 is illustrated. The sidewall 19 of the dust collection device 16 comprises four layers, an optional inner support layer 22, a first filter layer 24, a second filter layer 26 and an outer support layer 28. The optional inner support layer 22 and the outer support layer 28 are provided for the protection of the filter layers and to prevent the dust collection device from bursting, rupturing or tearing during operation at high pressures. The four layers are positioned in a face to face relationship thereby forming a composite sidewall material 29.

The first filter layer 24 can comprise a lofty nonwoven web of charged electret containing fibers, which can be any suitable open nonwoven web of charged fibers. The filter layer 24 could be formed of the split fibrillated charged fibers described in U.S. Pat. No. RE 30,782 to Van Turnhout. The electret fibers in U.S. Pat. No. RE 30,782 are formed from a corona charged film that is fibrillated to form the charged fibers. This charging method provides a particularly high density of injected charges in the finished fibers. The charged fibers can then be formed into a nonwoven filter web by common methods such as carding or air laying. For example, the electret fibers can be carded to form a nonwoven web and the nonwoven web then needle-punched to increase its integrity. Optionally, the nonwoven web of fibrillated electret fibers can be joined to a supporting scrim such as disclosed in U.S. Pat. No. 5,230,800 to Nelson and in U.S. Pat. No. 5,792,242 to Haskett.

The nonwoven web of fibrillated electret fibers and optional support scrim, when joined together by a needle-punching operation, produces a filter medium which is extremely uniform in its physical and performance characteristics. Desirably, the optional scrim support should be an extremely open material having a large number of discrete open areas, which open areas pass through the scrim from one face to the opposite face. These discrete open areas should have an average cross-sectional area of at least 0.25 $mm^2$, most preferably at least 1.0 $mm^2$, however, the individual open areas can range in size from 0.1 $mm^2$ up to 10 $mm^2$ or larger. Preferably, the open areas have a non-tortuous path through the scrim, most preferably the open areas extend directly from one face to the opposite face (e.g., as a column).

Generally, the ratio of open area average path length through the scrim to the average scrim thickness is from 3 to 1, preferably from 2 to 1 and less. The scrim open area can also be described in terms of an Effective Circular Diameter (ECD) which is the diameter of the largest circle that can fit into an individual discrete open area. The average ECD is generally at least 300 µm, preferably at least 500 µm. Despite the extremely open nature of the scrim support material, it should be reasonably strong, generally having a tensile strength of at least 50 kg/m, preferably at least 100 kg/m. The overall pressure drop of the scrim material should be relatively small in comparison to the pressure drop across the electret-charged filter web material (e.g., less than 50 percent preferably less than 30 percent of the filter web pressure drop) and generally will have a pressure-drop of less than 1.5 mm $H_2O$, preferably less than 1.0 mm $H_2O$, and most preferably less than 0.5 mm $H_2O$ at 85 liters/minute air flow as tested by the Pressure Drop Measurement test method.

The optional scrim material can be formed of any suitable material such as a thermoplastic polymer, ductile metal or the like. Preferably, the scrim is formed of thermoplastic fibers such as a scrim or netting material such as the cross-laminated polyethylene fibers sold under the trade name CLAF by Amoco. Other cross laminated fibrous webs could also be used, with the lamination done by conventional techniques such as heat, sonics or adhesive lamination.

The electret fibers can be charged by known methods, e.g., by use of corona discharge electrodes or high-intensity electric fields or by tribo-charging (as described in U.S. Pat. No. 4,798,850 to Brown). The fibers can be charged during fiber formation, prior to or while forming the fibers into the filter web or subsequent to forming the filter web. The fibers forming the filter web can even be charged subsequent to being joined to the scrim support layer.

Alternatively, the first filter layer 24 can comprise a lofty nonwoven web such as a carded polyester web, carded polypropylene web, or carded polyolefin web. The lofty nonwoven can be optionally charged to enhance its performance. One suitable first filter layer material is a carded polyester nonwoven web available from Precision Textiles, Totowa, N.J.

The first filter layer 24 can be made of a single ply or multiple plies placed in a face to face relationship. Depending on the uniformity of the manufacturing process, it may be desirable to stack multiple plies to create the first filter layer 24 rather than form one individual thicker layer. The first filter layer 24 can have a total basis weight ranging between about 100 to about 300 grams/m$^2$, or between about 115 to 250 grams/m$^2$, or between about 125 to 250 grams/m$^2$, or between about 140 to about 200 grams/m$^2$, or between about 50 to about 450 grams/m$^2$ when used as a first filter in a dust collection device 16. Generally, the first filter layer 24 has a combined total pressure drop of between about 0.1 to about 4.0 mm H$_2$O, or between about 0.15 to about 4.0 mm H$_2$O, or between about 1.0 to about 4.0 mm H$_2$O, or between about 1.5 to about 3.0 mm H$_2$O, or between about 1.7 to about 2.4 mm H$_2$O, or between about 0.2 to about 2.4 mm H$_2$O, or between about 0.25 to about 2.0 mm H$_2$O at 85 liters/minute air flow as tested by the Pressure Drop Measurement test method.

The total thickness of the first filter layer 24 under a pressure of 0.05 psi with a 3.5 inch diameter platen (ASTM D5736-95 reapproved 2001) is desirably greater than about 2.5 mm, or between about 2.5 to about 4.5 mm, or between about 3.0 to about 4.0 mm, or between about 3.0 to about 8.0 mm, or between about 3.0 to about 10.0 mm, or between about 3.0 to about 15.0 mm, or between about 3.0 to about 12.0 mm, or between about 3.0 to about 20.0 mm. In general, sufficient thickness and basis weight should be provided to trap the dust and debris within the structure of the first filter layer 24 instead of on the layer's surface. Furthermore, the first filter layer 24 should have a total pressure drop within the specified ranges so as to not unduly impede the exhaust airflow from the sanding tool and to catch the majority of the dust and debris in the exhaust stream.

The second filter layer 26 can comprise a melt blown microfiber nonwoven web, and be optionally charged as disclosed in U.S. Pat. No. 4,917,942 to Winters. It is believed that a charged second filter layer 26 in addition to a charged first filter layer 24 is more effective in capturing dust and debris. Melt blown nonwoven webs are typically formed by the process taught in Wente, Van A., "Superfine Thermoplastic Fibers" in Industrial Engineering Chemistry, volume 48, pages 1342 et seq., (1956), or Report No. 4364 of the Naval Research Laboratories, published May 25, 1954, entitled "Manufacture of Superfine Organic Fibers" by Wente, Van A., Boone, C. D. and Feluharty, E. L., which fibers are collected in a random fashion, such as on a perforated screen cylinder or directly onto a support web or in the manner described in PCT Application No. WO 95/05232 (between two co-rotating drum collectors rotating at different speeds creating a flat surface and an undulating surface). The collected material can then be subsequently consolidated, if needed, and charged, such as in the manner described in U.S. Pat. No. 4,215,682 to Kubik. Alternative charging methods to form electrets include the methods described in U.S. Pat. Nos. 4,375,718 or 4,592,815, or PCT application number WO 95/05501.

A variety of polymeric fiber-forming materials may be used to form the melt blown microfiber nonwoven web. The polymer may be essentially any thermoplastic fiber-forming material capable of providing a charged nonwoven web which will maintain satisfactory electret properties or charge separation. Preferred polymeric fiber-forming materials are non-conductive resins having a volume resistivity of $10^{14}$ ohm-centimeters or greater at room temperature (22° C.). Preferably, the volume resistivity is about $10^{16}$ ohm-centimeters or greater. Resistivity of the polymeric fiber-forming material may be measured according to standardized test ASTM D 257-93. The polymeric fiber-forming material also preferably is substantially free from components such as antistatic agents that could significantly increase electrical conductivity or otherwise interfere with the fiber's ability to accept and hold electrostatic charges. Some examples of polymers which may be used in chargeable webs include thermoplastic polymers containing polyolefins such as polyethylene, polypropylene, polybutylene, poly(4-methyl-1-pentene) and cyclic olefin copolymers, and combinations of such polymers. Other polymers which may be used but which may be difficult to charge or which may lose charge rapidly include polycarbonates, block copolymers such as styrene-butadiene-styrene and styrene-isoprene-styrene block copolymers, polyesters such as polyethylene terephthalate, polyamides, polyurethanes, and other polymers that will be familiar to those skilled in the art. The fibers preferably are prepared from poly-4-methyl-1 pentene or polypropylene. Most preferably, the fibers are prepared from polypropylene homopolymer because of its ability to retain electric charge, particularly in moist environments.

The electric charge can be imparted to the melt blown microfiber nonwoven web in a variety of ways. This may be carried out, for example, by contacting the web with water as disclosed in U.S. Pat. No. 5,496,507 to Angadjivand et al., corona-treating as disclosed in U.S. Pat. No. 4,588,537 to Klasse et al., hydrocharging as disclosed, for example, in U.S. Pat. No. 5,908,598 to Rousseau et al., plasma treating as disclosed in U.S. Pat. No. 6,562,112 B2 to Jones et al. and U.S. patent application number US2003/0134515 A1 to David et al., or combinations thereof.

Additives may be added to the polymer to enhance the melt blown microfiber nonwoven web's filtration performance, electret charging capability, mechanical properties, aging properties, coloration, surface properties or other characteristics of interest. Representative additives include fillers, nucleating agents (e.g., MILLAD™ 3988 dibenzylidene sorbitol, commercially available from Milliken Chemical), electret charging enhancement additives (e.g., tristearyl melamine from 3M, and various light stabilizers such as CHIMASSORB™ 119 and CHIMASSORB 944 from Ciba Specialty Chemicals), cure initiators, stiffening agents (e.g., poly(4-methyl-1-pentene)), surface active agents and surface treatments (e.g., fluorine atom treatments to improve filtration performance in an oily mist environment as described in U.S. Pat. Nos. 6,398,847 B1, 6,397,458 B1, and 6,409,806 B1 to Jones et al.). The types and amounts of such additives will be familiar to those skilled in the art. For example, electret charging enhancement additives are generally present in an amount less than about 5 wt. % and more typically less than about 2 wt. %.

The second filter layer 26 can be made of a single ply or multiple plies placed in a face to face relationship. Depending on the uniformity of the manufacturing process, it may be desirable to stack multiple plies to create the layer rather than form one individual thicker layer. The second filter layer 26 can have a total basis weight ranging between about 25 to about 75 grams/m², or between about 40 to 60 grams/m², or between about 15 to 75 grams/m² or between about 20 to 60 grams/m² when used as a second filter layer in combination with the first filter layer 24. Generally, the second filter layer 26 has a total pressure drop of between about 5.5 to about 20.0 mm $H_2O$, or between about 10.0 to about 18.0 mm $H_2O$, or between about 12.0 to about 15.0 mm $H_2O$, or between about 8.0 to about 13.0 mm $H_2O$ at 85 liters/minute air flow as tested by the Pressure Drop Measurement test. The total thickness of the second filter layer 26 under a pressure of 0.05 psi with a 3.5 inch diameter platen (ASTM D5736-95 reapproved 2001) is between about 0.2 to about 1.2 mm, or between about 0.3 to about 1.0 mm, or between about 0.5 to about 0.8 mm, or between about 0.7 to about 1.0 mm. In general, the pressure drop of the second filter layer should be as low as possible to capture particles having an average particle diameter of about 0.5 micrometer or greater. If the second filter layer is too restricted, it will quickly plug rendering the dust collection device inoperable. If the second filter layer is too open, it will pass too many fine particles through to the atmosphere rendering the dust collection device ineffective.

The composite material forming the dust collection device's sidewall 19 is further provided with the optional inner support layer 22 and the outer support layer 28. Desirably, all of the layers or plies of material forming the composite sidewall material 29 are substantially unbonded to each other except at the periphery of the dust collection device 16 along a seam 30 on three sides of the bag 17. Alternatively, the individual layers or plies can be bonded to adjacent layers or plies provided that the bonding method does not significantly reduce the air flow through the composite sidewall material 29 of the dust collection device 16.

Both the inner support layer 22 and the outer support layer 28 can be formed of a nonwoven or woven fibrous material. Desirably, for ease of manufacturing, cost, and performance the outer support layer 28 and the inner support layer 22 are nonwoven fibrous web materials formed at least in part from heat-sealable or weldable thermoplastic fibers. Examples of such materials include spunbond webs, spunlace webs and consolidated carded and air-laid webs. Alternatively, other methods can be used to form the seam 30 such as stitching or adhesive in which case, the inner support layer and outer support layer (22, 28) can be a non heat-sealable, porous fibrous material, such as a paper, cloth or the like.

The inner support layer and outer support layer (22, 28) should have sufficient tensile strength to protect the first filter layer and second filter layer (24, 26) from tearing under the extremely high pressures (up to 90 psig (620 kPa)) that are present inside the dust collection device 16 when in use. Unlike conventional vacuum cleaner bags or furnace filters, the dust collection device 16 operates to filter air under a much higher pressure and under significantly greater flow rates.

The outer support layer 28 should generally have an air permeability of at least about 50 m³/min/m², or at least about 100 m³/min/m² or at least about 500 m³/min/m² or greater as tested by ASTM D737. The basis weight of the outer support layer 28 is generally between about 10 to about 100 g/m².

The outer support layer 28 can be either bonded or non-bonded to the second filter layer 26 with the exception of the seam 30 area. However, if the outer support layer 28 is bonded to the second filter layer 26, it is done so in a manner that will not significantly decrease the open area of the composite sidewall material 29. Acceptable bonding methods include adhesives, spot ultrasonic welding or heat bonding or the like. Generally, the bonded area should be no more than 20% of the composite sidewall material's area or generally less than 10% of the area.

The inner support layer 22 should generally have an air permeability of at least about 50 m³/min/m², or at least about 100 m³/min/m² or greater as tested by ASTM D737. The inner support layer 22 generally has a basis weight of between about 10 to 100 g/m², or between about 15 to 40 g/m². The inner support layer 22 generally has a tensile strength of at least about 0.10 kg/cm, or at least about 0.15 kg/cm. Suitable inner support layers include spun bond webs of thermoplastic fibers, consolidated carded webs such as point bonded carded webs of polyolefin (e.g., polypropylene) staple fibers, and scrim, netting or mesh materials. When the seam 30 is a welded seam it is desirable to include a thermoplastic inner support layer 22 to assist in heat sealing the seam 30; especially, if the first filter layer 24 is quite thick or not readily melted. Desirably, the inner support layer 22 is a net or mesh type of material having a high permeability that protects the first filter layer 24, improves reliability of the welded seam 30, and minimally restricts the airflow through the composite sidewall material 29.

Figure 8:
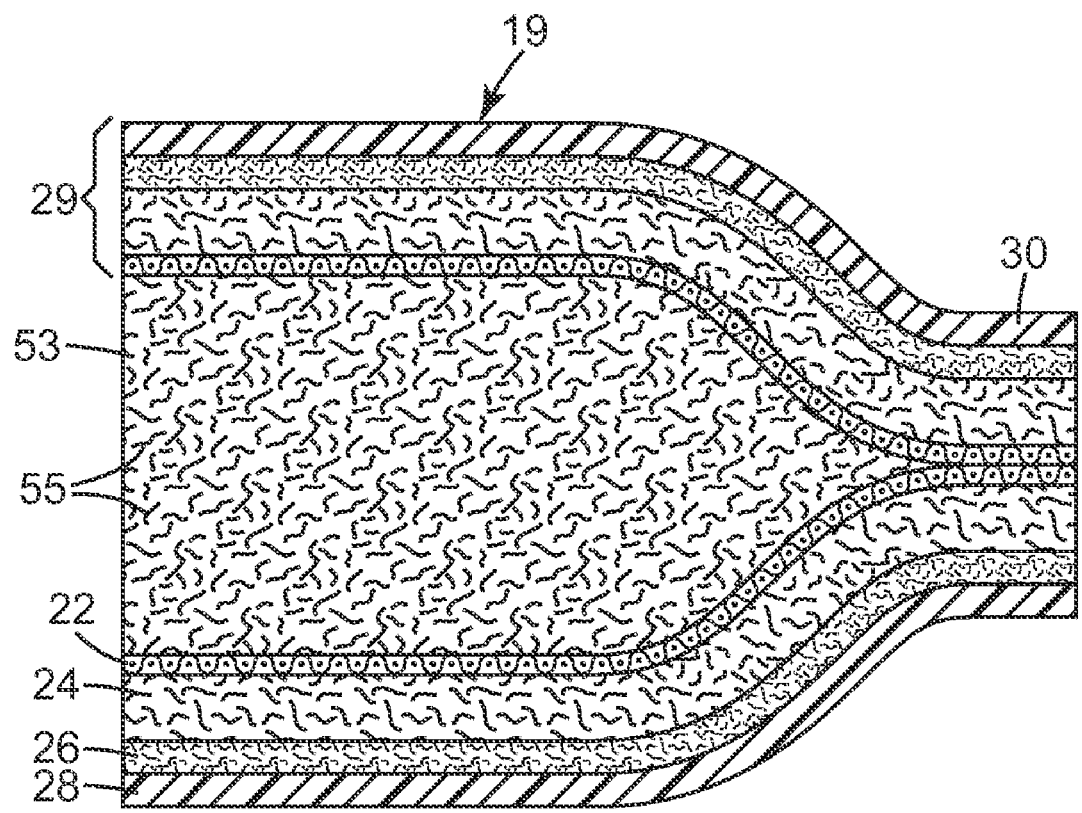
FIG. 8 illustrates a cross section of the sidewall for a second embodiment of the dust collection device taken at 2-2 in FIG. 1.

In some optional embodiments, the internal cavity 53 of the bag portion 17 may contain a predetermined amount of a lofty filling material 55 as shown in FIG. 8. Suitable loft filling materials include, for example, natural or synthetic fibers, which are staple length, random length, or continuous length; shredded or chopped fibrous web materials, shredded or chopped foam materials, feathers, goose down, fibrous plant residue, reticulated foam, open-celled foam, and mixtures thereof. The insertion of such fill materials can extend the filtration efficiency of the inventive filter bag. Suitable amounts of the lofty filling material can be determined based on the size or volume of the bag 17. In one embodiment, for a bag measuring approximately 30.5 cm long by 11.5 cm wide, the amount of lofty filling material can be between about 10 to about 55 grams, or between about 15 grams to about 35 grams, or between about 20 to about 30 grams.

While not wishing to be bound by theory, the inventors believe that the improved results, as demonstrated in the following examples when the dust collection device 16 is attached to the dust exit port 20 of a sanding tool 10, occur from the selection of the materials forming the first and second filter layers (24, 26). In particular, the first filter layer 24 is used as a collection device for the course and medium particulate and the second filter layer 26 is used as a screen to prevent extremely fine particulates from escaping. Therefore, in order to maximize the life of the dust collection device, the properties of the two layers should be carefully selected. If the first filter layer is too fine, it will quickly plug up rendering the second filter layer redundant. Conversely if the first filter layer is too course, most of the dust and debris will be retained only by the second filter layer, which will become quickly plugged up.

Secondly, it is desirable that the first filter layer has a relatively open, torturous air flow path through the material such that when dust or debris plugs one area, the air flow can divert sideways through the material to a new area. In this manner, the dust does not collect primarily on the surface of the material, but will instead be drawn in and through the material filling in the interstices between the fibers forming the material. In this manner, the first filter layer acts as a collection device storing the majority of the sanding debris and sending only the very fine particles to the second filter layer. Since a significant portion of the dust and debris is stored within the structure of the first filter material 24, when the dust collection device is used in a vertical orientation there is an improvement in the efficiency of the dust collection device to store additional sanding debris. As such, there is less shifting of the debris within the dust collection device as its orientation is changed from horizontal to vertical since much of the dust is physically entrapped within the structure of the first and second filter layers (24, 26).

Figure 3A:
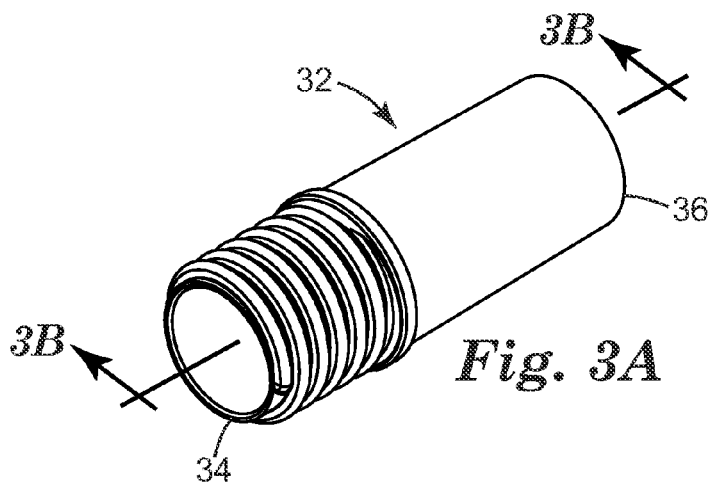
FIGS. 3A and 3B illustrates views of an adapter for use with the dust collection device.
Figure 3B:
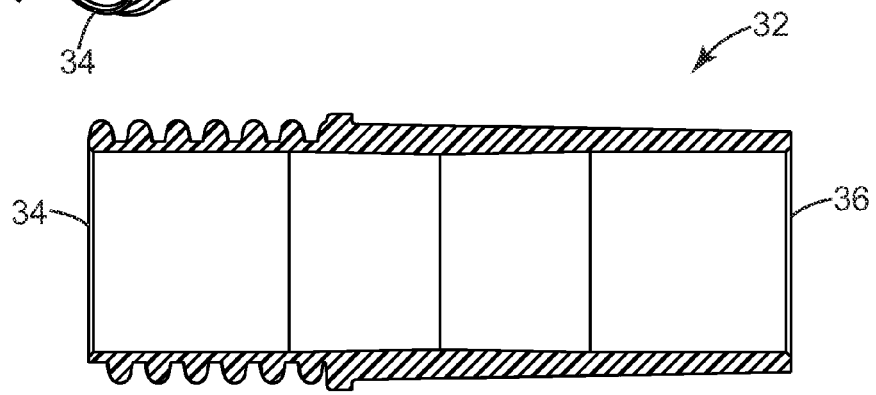

Referring to FIGS. 3A and 3B, an adapter 32 is illustrated. The adapter includes a first threaded end 34 and a second internally tapered end 36. The thread pitch and size on the first threaded end 34 can be changed to mate with various pitch threads used on pneumatic sanding tools. Alternatively, the first threaded end can be eliminated and another mating surface provided to engage with the dust exit port 20 of the sanding tool 10. For example, the internal bore of the first threaded end 34 can be sized as a slight interference fit with the outer bore of the dust exit port 20 for removably attaching the adapter 32 to the dust exit port 20. Thus, multiple adapters can be provided to enable use of the dust collection device 16 with multiple brands of sanding tools.

Figure 4A:
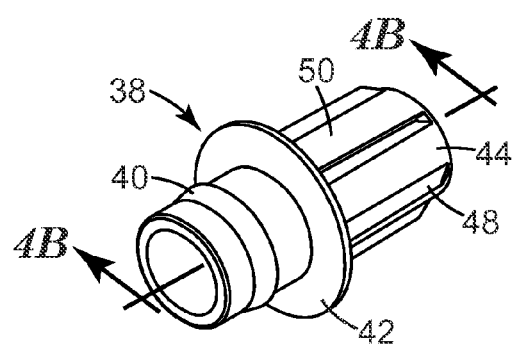
FIGS. 4A and 4B illustrates views of a coupler for the dust collection device.
Figure 4B:
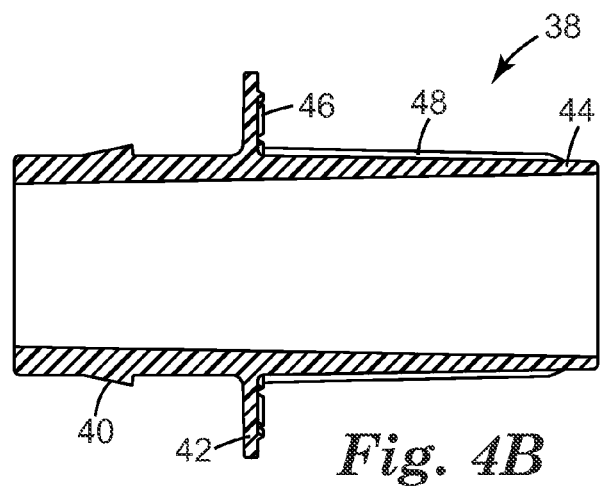

The second internally tapered end 36 of the adapter 32 can be sized for an interference fit with the coupler 38 illustrated in FIGS. 4A and 4B. The second internally tapered end 36 can optionally include a first portion that is not tapered immediately adjacent to the second end before the tapered portion of the second end begins. The coupler 38 can include a barbed first end 40, a flange 42, and a ribbed second end 44. In one embodiment, the adapter 32 is significantly longer than the barbed first end 40 such as about 2 to about 10 times, or about 3 to about 4 times the length of the first barbed end 40. A longer length adapter 32 allows for the adapter to be slipped over the dust exit port 20 of some sanding tools while simultaneously providing at least a portion of the internal bore being unobstructed for engaging with the barbed first end 40. The barbed first end 40 is sized for an interference fit with the internal bore of the second internally tapered end 36 of the adapter 32. In one embodiment, the barbed first end 40 mates with the non-tapered first portion of the second end to provide a more consistent interference fit. The interference fit should be substantially air tight at pressures of about 90 psi (620 kPa) or less.

In one embodiment, the second internally tapered end 36 had a circular cross section and the barbed first end 40 had an oval shape cross section with two opposing flat sides and two opposing curved ends similar to a speed skating rink. It is believed that having different cross sectional geometries for the second internally tapered end 36 and the barbed first end 40 provides for a tighter interference fit. To enhance the holding ability of the coupler 38 within the adapter 32 at high pressures, one of the items can be made from an elastomeric material. Desirably, the adapter 32 is made from an elastomeric material and the coupler 38 is made from a rigid plastic material. In one embodiment, the adapter 32 was made from SANTOPRENE 201-80 available from Advanced Elastomer Systems L.P., Akron, Ohio, and the coupler 38 was made from rigid polypropylene.

Referring again to FIGS. 4A and 4B, the coupler 38 is attached to the composite sidewall material 29 by the flange 42. Desirably, the flange 42 is heat welded to the composite sidewall material 29. To facilitate the heat welding, the side of the flange 42 attached to the outer support layer 28 can include a plurality of sacrificial ribs 46 that melt to the outer support layer 28. Once attached, the ribbed second end 44 of the coupler 38 is positioned inside the bag 17 of the dust collection device 16. The ribbed second end includes a plurality of gripping ribs 48 that project outwardly from a radial surface 50 of the ribbed second end. The plurality of gripping ribs 48 enables improved torque transmission through the composite sidewall material 29 to the coupler 38. This enables the coupler 38 to be readily twisted as it is force fit into the second internally tapered end 36 of adapter 32. Without the gripping ribs 48, it is more likely that the composite sidewall material 29 would be torn away from the flange 42 where it is heat sealed by the twisting motion used to insert the coupler 38 into the adapter 32. Rather than the gripping ribs 48, the second end of the coupler can have flats placed onto the radial surface 50 or the shape of the second end could be changed to a polygon such as triangular or square to improve the torque transmission.

While a specific configuration for the adapter 32 and the coupler 38 have been illustrated, other mechanical connection elements known to those of skill in the art can be used to attach the bag 17 to the dust exit port 20. For example, a flange (coupler) that slips over the outer bore of the dust exit port 20 can be provided in the sidewall 19. A strap attached near one end of the bag 17 can be used to cinch the open end of the bag to the dust exhaust port. Typical connectors used for air hoses, garden hoses, vacuum hoses and the like can be used.

In some embodiments, depending on the weight of the material collected in the bag 17, the ribbed second end 44 or the coupler's second end can be lengthened to extend a significant distance into the bag to support the bag during use. The ratio of the length, L, of the ribbed second end 44 residing inside the bag 17 to the inside length of the bag 17 can be between about 0.25 to about 0.9, or between about 0.5 to about 0.75, or between about 0.4 to about 0.8. When the length of the ribbed second end 44 or the coupler's second end is increased, holes, slots, or other apertures along the length of the ribbed second end can be provided to create a diffuser such that material entering the bag 17 is spread out along the length of the ribbed second end 44.

Figure 6:
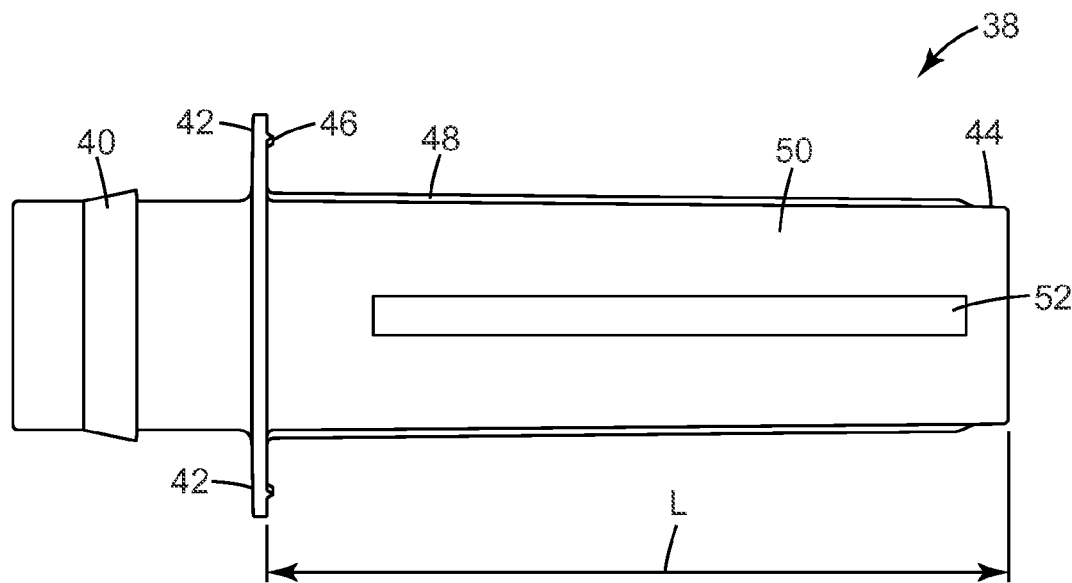
FIG. 6 illustrates an alternative coupler for the dust collection device.

Referring to FIG. 6, an alternative embodiment for the coupler is shown. The length of the coupler's second end is increased and the coupler includes at least one diffuser orifice 52 along the extended length of the coupler's second end that resides within the bag portion 17 of the dust collection device 16. The at least one diffuser orifice can be a plurality of holes, slots, slits, or other opening through the radial surface 50 of the coupler 38 that allows for diffusing the incoming air flow. In one embodiment, 2 axial slots having a width of 6.4 mm, a length of 127 mm, and located 180 degrees apart on the radial surface 50 formed the at least one diffuser orifice 52 and the length of the coupler's second end was 16.5 cm. In another embodiment, the at least one diffuser orifice comprised 16 holes, having a 2.75 mm diameter, that were spaced axially and radially along the 16.5 cm length of the coupler's second end.

Figure 7:
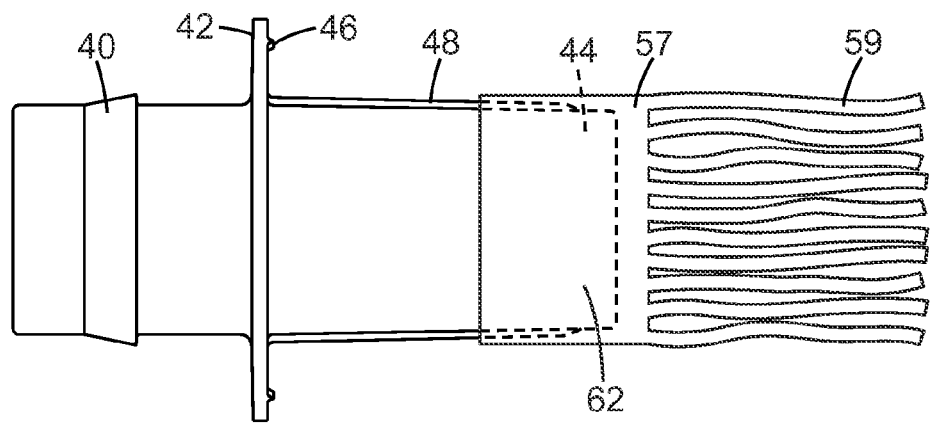
FIG. 7 illustrates an alternative coupler for the dust collection device.

Referring to FIG. 7, an alternative embodiment of the coupler 38 is shown. The coupler of FIGS. 3 and 4 is modified to include a flexible diffuser 57. In one embodiment, the flexible diffuser comprised a body section 62 and a plurality of flexible filaments 59. The body section is attachable to the ribbed second end 44 and can have a suitable cross sectional geometry, such as circular, to match the geometry of the ribbed second end. In other embodiments, the flexible diffuser can be inserted into the ribbed second end 44, over the ribbed second end, or attached to the ribbed second end. Suitable flexible diffusers can include bristles, strings, streamers, brushes, fibrous material, nonwoven materials, elastomeric materials, and cloth materials.

In one embodiment, a plurality of filaments 59, such as 6 filaments, was cut into a preformed circular elastomeric material comprising nitrile rubber and having an unstretched diameter of approximately 1.5 inches (38.1 mm) and a 0.015 inch (0.381 mm) thickness. The cuts extended approximately 3 inches (76.2 mm) from the end and the flexible diffuser had an overall length of approximately 5 inches (12.7 cm). The flexible diffuser was attached to the ribbed second end 44 by stretching the circular body section 62 over the ribbed second end.

In another embodiment, a plurality of filaments 59, such as 12 filaments, was cut into a cloth material approximately 8 inches long, 4.5 inches wide, and 0.060 inch thick (20.3 cm×11.4 cm×1.5 mm). Each filament was approximately 0.75 inches wide and 3 inches long (19.0 mm×76.2 mm). The cloth material was wrapped around the outside of the ribbed second end 44 and secured using a self-locking plastic strap. This flexible diffuser was tested in Example 16 as described later.

Similar to the diffuser orifice 52 above, the flexible diffuser 57 slows down the incoming dust laden air and redirects the airflow within the internal cavity 53 of the bag 17. Slowing the incoming air and redirecting it can increase the dust collection capacity of the dust collection device 16. It is believed that the flexible diffuser 57 results in a more random airflow distribution within the internal cavity 53 than the diffuser orifice 52, and is believed to result in enhanced dust collection ability. When tested compared to a dust collection device 16 having a coupler 38 as illustrated in FIGS. 3-4, the flexible diffuser equipped coupler as shown in FIG. 7 increased the capacity of the dust collection device by approximately 25%.

In one embodiment, the dust collection device 16 can be made by the following steps. The composite sidewall material 29 is assembled by overlying the individual layers or plies forming the composite sidewall material shown in FIG. 2. Each layer or ply is cut to the desired width of the bag 17 and to a length twice as long as the bag 17. A hole is cut through the composite sidewall material 29 near the geometric center of the layers and the coupler 38 is inserted through the hole such that the sacrificial ribs 46 are positioned adjacent to the outer support layer 28. The composite sidewall material 29 is then heat welded to the flange 42. The composite sidewall material 29 is then folded in half lengthwise such that the barbed first end 40 of the coupler 38 is positioned at one end of the bag 17. The top, bottom, and end of the bag 17 opposite the coupler 38 are then heat sealed to form the seam 30 completing the assembly steps.

Another embodiment of the invention resides in a kit for sale to users of dust collection bags for sanding tools. The kit includes the dust collection device 16 with the coupler 38 attached to the bag 17, an adapter 32, and instructions for attaching the first threaded end 34 of the adapter 32 to the dust exit port 20 of a sanding tool 10. Further steps included are instructions for inserting the barbed first end 40 of the coupler 38 into the second internally tapered end 36 of the adapter 32. The instructions provided with the kit can be written words, illustrations using pictures, drawings or photographs, or a combination of written words and illustrations that convey the working relationship of the various components in the kit and how the components are attached to a sanding tool. Alternatively, oral instructions can be provided by a sales representative who is demonstrating or selling the dust collection device 16 to a prospective customer.

Test Methods

Pressure Drop Measurement

The pressure drop across a layer of the composite sidewall material 29 of the dust capture device 16 is determined using a TSI Model 8130 high-speed automated filter tester (commercially available from TSI Incorporated, St. Paul, Minn.) at a flow rate of 85 liters/min, which is a face velocity of 13.8 centimeters per second. A salt aerosol spray is used during the testing and a 2% salt solution is placed in the salt aerosol generator. The TSI Model 8130 is configured, calibrated, and operated according to the Operation and Service Manual provided with the tester when testing the layer of material.

EXAMPLES

The following material abbreviations are used throughout the Examples.

| ABBRE-VIATION | DESCRIPTION |
|---|---|
| AD1 | A 12.7 cm (5") multi-hole coated abrasive disc, commercially available under the trade designation "Clean Sanding Disc 360L GRADE P220" from 3M Company, St. Paul, Minnesota. |
| AD3 | A 12.7 cm (5") multi-hole coated abrasive disc, commercially available under the trade designation "Clean Sanding Disc 236U GRADE P100" from 3M Company, St. Paul, Minnesota. |
| AD4 | A 12.7 cm (5") multi-hole coated abrasive disc, commercially available under the trade designation "Clean Sanding Disc 236U GRADE P220" from 3M Company, St. Paul, Minnesota. |
| FM1 | A 1.6 oz./sq. yd. (54 gsm) polypropylene spunbond web, commercially available as "TYPAR" from Fiberweb, Washougal, Washington. |
| FM2 | A microfiber melt blown nonwoven web produced and charged according to the methods outlined in Example 1 of U.S. patent number 6,923,182, with the difference that the melt blown web had a basis weight of 25 grams per square meter. The melt blown web was made using a die with uniform orifice diameters. The resin used was a polypropylene resin available from Total S.A. of Paris, France, under the designation 3960. The microfiber melt blown nonwoven web had a basis weight of approximately 25 grams/m$^2$, a solidity of approximately 8.4%, and an Effective Fiber Diameter of approximately 4.7 µm. |
| FM3 | A microfiber melt blown nonwoven web produced and charged, according to the methods outlined in Example 1 in U.S. patent number 6,923,182, The melt blown web was made using a die with uniform orifice diameters. The resin used was a polypropylene resin available from Total S.A. of Paris, France, under the designation 3960. The microfiber melt blown nonwoven had a basis weight of approximately 35 grams/m$^2$, a solidity of approximately 8.4%, and an Effective Fiber Diameter of approximately 4.7 µm. |
| FM4 | Two plies of FM2 were used for this layer |
| FM5 | Two plies of FM3 were used for this layer |
| FM6 | A 150 gsm polypropylene nonwoven electret fabric, commercially available under the trade designation "3M FILTRETE-G150" from 3M Company, St. Paul Minnesota. |
| FM7 | A 200 gsm polypropylene nonwoven electret fabric, commercially available under the trade designation "3M FILTRETE-G200" from 3M Company, St. Paul Minnesota. |
| FM8 | A 90 gsm polypropylene nonwoven electret fabric, commercially available under the trade designation "3M FILTRETE-G90" from 3M Company, St. Paul Minnesota. |
| FM9 | A polypropylene screen fabric, commercially available under the trade designation "NALTEX 37-4057" from Nalle Plastics, Austin TX. (not die cut) |
| B1 | Ingersoll Rand 10.2 cm × 25.4 cm (4 in × 10 in) paper bag, "PN 49973"as supplied for model 4152 random orbital sanders, Ingersoll Rand, Annandale, New Jersey. |
| B2 | Hoover Vacuum Bag part no. 4010801Y, available from www.hoover.com, cut to 10.2 cm × 25.4 cm (4.6 in. × 12.2 in.). |

-continued

| ABBRE-VIATION | DESCRIPTION |
|---|---|
| B3 | Cloth Dust Bag 50694 (3 × 10) available from Dynabrade Corporation, Clarence, New York. |
| Coupler | A coupler 38 as illustrated in FIG. 4 or 6 for attaching the bag 17 to the dust exit port of the sanding tool. |
| Adapter | An adapter 32 as illustrated in FIG. 3 for connecting the coupler to the dust exit port of the sanding tool. |

Examples 1-6 and 8

Examples 1-6 and 8 were prepared in the following manner: Layers of Material were placed in a face to face relationship in the order shown in Tables 1 and 2. The layers were then cut as a group, to 24"×4.5" (61 cm×11.5 cm) sections. The sections were then folded over to form envelopes with the inner support layer 22 positioned in the middle. The envelopes for Examples 1-8 were 12"×4.5" (30.5 cm×11.5 cm). The two long edges of each envelope were sealed using masking tape and staples to create an air-tight seam. The open end of the envelope was then taped to the dust exit port of the sanding tool and tested under Test Methods 1 and 2, with results shown in Tables 1 and 2.

Examples 7 and 9

Examples 7 and 9 were prepared similarly to Examples 1 and 8 respectively, except prior to folding over, the laminate was ultrasonically welded as described in Welding Process 1 at a location approximately in the center of the laminate. After Welding Process 1, a 1.25" (3.8 cm) diameter hole was die cut in the center of the weld to give a 2" (2 cm) ring of uniform sealed material with an 1.25" (3.8 cm) opening. The resulting sealed ring and the coupler where jointed using hot melt adhesive trade designation "Jet Melt Adhesive 3764-PG" from 3M Company, St. Paul, Minn. The bond was made using 10 pounds of force (44.5 N) for 5 seconds and allowed to cool to 25 degrees C. Once the coupler was bonded to the laminate, the layers were folded over to form envelopes similar to those of Examples 1 and 11, except that the two long edges and the short edge of the envelope were ultrasonically welded as described in Ultrasonic Welding Process 2.

Ultrasonic Welding Process 1:

A circular ring was welded into the laminate using a model "DUKANE 3000 AUTO TRAC 20 KHZ ULTRASONIC WELDER", obtained from Dukane Intelligent Assembly Solutions, St. Charles, Ill. Welding conditions were as follows:

Horn: 3" (7.6 cm) dia by 4.7" (12 cm) long Aluminum cylinder
Anvil Steel disc 2" (5 cm) OD×1.25" (3.2 cm) ID
Laminate Orientated with Layer 4 contacting the Horn
Booster: 1:1.5
Weld Parameters:
Method: Weld by Energy @ 3000 J
Pressure: 90 psi (620 kPa)
Hold Time 0.5 sec
Trigger Force 100 lb (445 N)
Amplitude % 100%
Time-out 8 sec Ultrasonic Welding Process 2

A series of edge seals were welded into the laminate using a Branson 2000d power supply 20 kHz, 4 kW with a Branson 2000aed actuator with a 3 inch (7.6 cm) diameter cylinder, available from Branson Ultrasonics Corp., Danbury Conn. The following conditions were used:

Horn: Dukane 9.5" wide bar horn, carbide tip, labeled "#2"
Anvil Fine knurl rail, 18"×3 mm×0.164"
Booster: 1:1
Weld Parameter
Method: Weld by Peak Power %, 32%
Pressure: 70 psi (483 kPa)
Hold Time 0.2 sec
Trigger Force 75 lb (334 N)
Amplitude % 100%
Time-out 3 sec Making of Vacuum Bag B2

A Hoover vacuum cleaner bag, part number 4010801Y available from www.hoover.com, was cut down to the size of 4.6" (11.7 cm)×12.2" (31 cm). Three sides of bag were sealed with the help of ultrasonic welding process. One 4.6" (11.7 cm) side was left open to connect to the end of sander for dust collection evaluation.

Making of the Paper Vacuum Bag B1

A standard paper vacuum bag part number 49973 from an Ingersoll Rand sanding kit was cut down to the size of 4.6" (11.7 cm)×12.2" (31 cm). Three sides of bag were sealed with the help of staples. One 4.6" (11.7 cm) side was left open to connect to the end of sander for dust collection evaluation.

Gel Coat Sanding Test Method 1

AD1 was attached to a 40-hole, 12.7-cm (5.0-inch) diameter by 0.95-cm (⅜-inch) thick foam back up pad, available under the trade designation "3M HOOKIT BACKUP PAD, #20206" from 3M Company. The backup pad and disc assembly was then mounted onto a 12.7-cm (5-inch) diameter, medium finishing, dual-action orbital sander, Model 050237, obtained from Air Vantage sander, El Monte, Calif. 91731. A pre-weighed dust collection device (11.43 cm×30.48 cm) was attached to the dust exit port of the sander. The abrasive face of the disc was manually brought into contact with a pre-weighed, 46 cm by 76 cm (18 inches by 30 inches) gel-coated fiberglass reinforced plastic panel, obtained from White Bear Boat Works, White Bear Lake, Minn. The sander was run at 620 kPa (90 psi) air line pressure and a down-force of 10 pounds force (44 N) for approximately 7 cycles of 150 seconds each. An angle of zero degrees to the surface of the workpiece was used. Each sanding cycle consisted of 48 overlapping transverse passes, for a combined 1008 inches (25.16 meters) total path length, at a tool speed of 17 cm per second (6.7 inches per second) across the panel surface resulting in an evenly sanded area of the test panel.

After the first sanding cycle, the test panel was cleaned by blowing compressed air across the top of the sanded panel to remove visible dust. The dust bag was removed from the sander and both the panel and the dust bag were weighed. The Dust Collection Efficiency was calculated by dividing the total weight of the sanded test panel and the dust bag by the combined initial weight of the test panel and the dust bag prior to sanding and multiplying by 100. The same dust bag was remounted on the dust exit port of the sander and the 150-second sanding cycle was repeated using the same test panel and a new abrasive disk, AD1, attached to the backup pad. The test panel was again cleaned by blowing compressed air across the top of the sanded panel to remove visible dust. The dust bag was removed from the sander a second time and both the test panel and the dust bag were weighed. The Dust Collection Efficiency after the second sanding was calculated by dividing the total weight of the sanded test panel and the dust bag by the combined initial weight of the test panel and the dust bag prior to sanding and multiplying by 100. Testing was continued as described above for each 150-second sanding cycle until the calculated dust collection efficiency fell below 70%.

During testing for the results of Table 1, the average cut rate for each 150 second sanding cycle was approximately 11-12 grams. The following measurements were made for each sample tested by this method and reported as an average of two test samples per Example in Table 1:

"Cut": Weight, in grams, removed from the plastic panel;
"Retain": weight, in grams, of particles collected in the sample bag; and
"Time-minutes at 70%": Time needed to reach 70% dust collection efficiency. "Dust Collection Efficiency" is the ratio of the Retain/Cut multiplied by 100.

TABLE 1

Gel Coat Sanding

| Example | Outer Support Layer (28) | Second Filter Layer (26) | First Filter Layer (24) | Inner Support Layer (22) | Time-minutes at 70% Efficiency |
|---|---|---|---|---|---|
| 1 | FM1 | FM4 | FM6 | FM9 | 24.0 |
| 2 | FM1 | FM3 | FM6 | none | 17.5 |
| 3 | FM1 | FM5 | FM7 | none | 16.0 |
| 4 | FM1 | FM3 | FM7 | none | 17.5 |
| 5 | FM1 | FM3 | FM8 | none | 12.5 |
| 6 | FM1 | FM2 | FM6 | none | 13.8 |
| 7 | FM1 | FM4 | FM6 | FM9 | 22.0 |
| B1 | | | | | 8.0 |
| B2 | | | | | 7.5 |
| B3 | | | | | 2.5 |

*Example 7 was prepared with Ultrasonic welding process and the coupler was glued to bag with hot melt adhesive. Examples 1 & 7 have same internal construction and same size.

Figure 5:
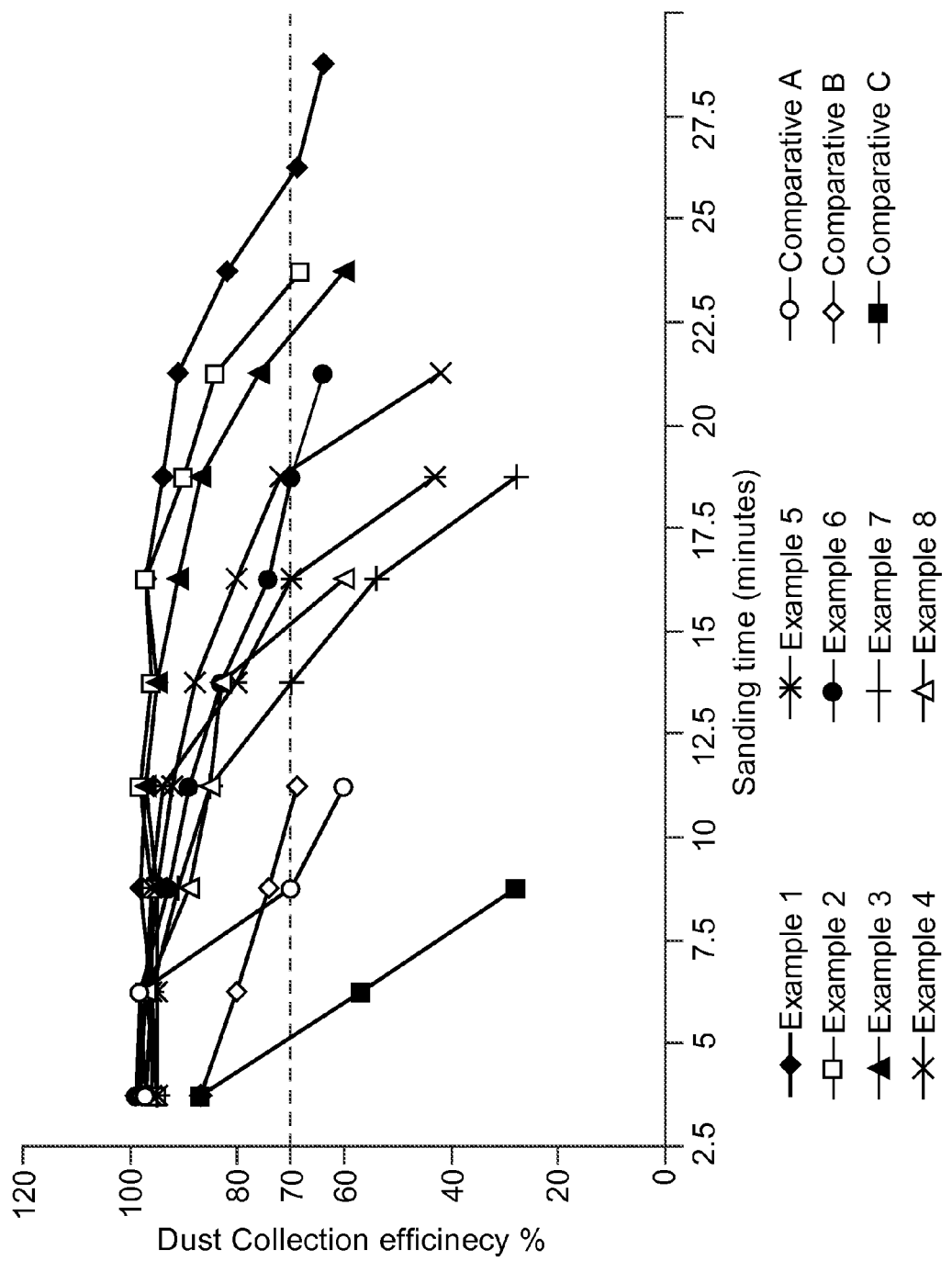
FIG. 5 illustrates a graph of Dust Collection Efficiency versus Time for the dust collection device and several commercially available dust collection bags for sanding tools.

FIG. 5 plots the results of the Gel Coat Sanding Test Method 1 after each sanding interval. A horizontal line is drawn for reference at the 70% dust collection efficiency level. Some of the Examples were tested for a longer period of time despite the fact that the Dust Collection Efficiency had dropped below 70%. As seen, the dust collection devices in Examples 1-7 having a first and a second filter layer (24, 26) had greatly improved performance over the comparative examples B1, B2, and B3.

Examples 10-15

Examples 10 through 15 were prepared identically to Example 1 and have the construction details identified in Table 3. Different couplers were used to prepare different bags and the details of couplers are listed in Table 2. The same Gel Coat Sanding Test Method 1 was used to evaluate different coupler designs. During testing for the results of Table 3, the average cut rate for each 150 second sanding cycle was approximately 15 grams.

TABLE 2

Coupler Configuration

| Style | Opening | Coupler End | Coupler Length cm | Coupler Diameter cm | Diffuser Orifice Area sq. mm. |
|---|---|---|---|---|---|
| A | 2 axial slots, 180 degrees apart width 6.4 mm, length 127 mm slots orientated towards sidewall | Open | 16.5 | 2.75 | 81.28 |
| B | 2 axial slots, 180 degrees apart width 6.4 mm, length 127 mm slots orientated towards seam | Open | 16.5 | 2.75 | 81.28 |
| C | 2 axial slots, 180 degrees apart width 6.4 mm, length 127 mm slots orientated towards sidewall | Closed | 16.5 | 2.75 | 81.28 |
| D | 16 holes, 2.75 mm, diameter | Open | 16.5 | 2.75 | 95.0 |
| E | no diffuser holes and no slots | Open | 16.5 | 2.75 | NA |
| F | no diffuser holes or slots, FIG. 4 | Open | 3.7 | 2.75 | NA |
| G | flexible diffuser attached to F | flexible filaments | 3.7 | 2.75 | NA |

TABLE 3

Gel Coat Sanding With Different Couplers

| Example | Outer Support Layer (28) | Second Filter Layer (26) | First Filter Layer (24) | Inner Support Layer (22) | Coupler | Time-minutes at 70% Efficiency |
|---|---|---|---|---|---|---|
| 10 | FM1 | FM4 | FM6 | FM9 | F | 13 |
| 11 | FM1 | FM3 | FM6 | FM9 | A | 18 |
| 12 | FM1 | FM5 | FM7 | FM9 | B | 15 |
| 13 | FM1 | FM3 | FM7 | FM9 | C | 16 |
| 14 | FM1 | FM3 | FM8 | FM9 | D | 16.5 |
| 15 | FM1 | FM2 | FM6 | FM9 | E | 13.8 |
| 16 | FM1 | FM4 | FM6 | FM9 | G | 19.9 |

As seen in Table 3, including at least one diffuser orifice 52 significantly improves the performance of the dust collection device 16 with the standard coupler, F, in Example 10 or with a lengthened coupler, E, in Example 15 without a diffuser orifice. The best performance occurred for the diffuser orifice was Example 11 using two axial slots with the axial slots pointed towards the bag's sidewall 19 as opposed to the bag's seam 30. Additionally, a flexible diffuser 57 using a cloth material, as previously described, significantly improves the performance of the dust collection device over the standard coupler, F, and performs better than a coupler having a diffuser orifice 52.

Hard Maple Wood Sanding Test Method 2

AD3 was attached to a 40-hole, 12.7-cm (5.0-inch) diameter by 0.95-cm (3/8-inch) thick foam back up pad, available under the trade designation "3M HOOKIT BACKUP PAD, #20206" from 3M Company. The backup pad and disc assembly were then mounted onto a 12.7-cm (5-inch) diameter, medium finishing, dual-action orbital sander, Model 050237, obtained from Air Vantage sander, El Monte, Calif. 91731. A pre-weighed dust collection device (11.43 cm×15.24 cm) was attached to the dust exit port of the sander. The abrasive face of the disc was manually brought into contact with a pre-weighed, 40.6 cm by 40.6 cm (16 inches by 16 inches) hard maple wood, obtained from Woodcrafts Industrial, St. Cloud, Minn. The sander was run at 620 kPa (90 psi) air line pressure and a down-force of 10 pounds force (44 N) for 7 cycles of 150 seconds each. An angle of zero degrees to the surface of the workpiece was used. Each cycle consisted of 48 overlapping transverse passes, for a combined 1008 inches (25.16 meters) total path length, at a tool speed of 17 cm per second (6.7 inches per second) across the panel surface resulting in an evenly sanded area of test panel.

After the first sanding cycle, the test panel was cleaned by blowing compressed air across the top of the sanded panel to remove visible dust. The dust bag was removed from the sander and both the panel and the dust bag were weighed. The Dust Collection Efficiency was calculated by dividing the total weight of the sanded test panel and the dust bag by the combined initial weight of the test panel and the dust bag prior to sanding and multiplying by 100. The same dust bag was remounted on the dust exit port of the sander and the 150-second sanding cycle was repeated using the same test panel and a new abrasive disk, AD3, attached to the backup pad. The test panel was again cleaned by blowing compressed air across the top of the sanded panel to remove visible dust. The dust bag was removed from the sander a second time and both the test panel and the dust bag were weighed. The Dust Collection Efficiency after the second sanding was calculated by dividing the total weight of the sanded test panel and the dust bag by the combined initial weight of the test panel and the dust bag prior to sanding and multiplying by 100. Testing was continued as described above for each 150-second sanding cycle until the calculated dust collection efficiency fell below 70%.

The following measurements were made for each sample tested by this method and reported as an average of two test samples per Example in Table 1 as indicated:

"Cut": Weight, in grams, removed from the plastic panel;

"Retain": weight, in grams, of particles collected in the sample bag; and

"Time-minute at 70%": Time needed to reach 70% dust collection efficiency. "Dust Collection Efficiency" is the ratio of the Retain/Cut multiplied by 100.

TABLE 4

| | Wood Sanding | | | | | |
|---|---|---|---|---|---|---|
| Example | Outer Support Layer (28) | Second Filter Layer (26) | First Filter Layer (24) | Inner Support Layer (22) | Time-minutes at 70% Efficiency | Comments |
| 8 | FM1 | FM4 | FM6 | FM9 | 56 | No dust leak |
| 9 | FM1 | FM4 | FM6 | FM9 | 70 | No dust leak |
| B3 | | | | | 10 | No dust leak-cloth |

*No dust leak: Dust was not observed on the bag's outer surface.
*Example 9 was prepared with Ultrasonic welding process and the coupler was glued to bag with hot melt adhesive. Example 8 & Example 9 have same internal construction with same size.

Horizontal to Vertical Sanding Test Method 3

AD4 was attached to a 40-hole, 5.0-inch (12.7-cm) diameter by 3/8-inch (0.95-cm) thick foam back up pad, available under the trade designation "3M HOOKIT BACKUP PAD, #21033" from 3M Company. The backup pad and disc assembly was then mounted onto a 5-inch (12.7-cm) diameter, medium finishing, dual-action orbital sander, model 21038, obtained from Dynabrade Corporation., Clarence, N.Y. The sander was run horizontally at 90 psi (620 kPa) air line pressure for 3 cycles of 60 seconds each. The workpiece was an automotive panel with DuPont 1140S primer coating. An angle of zero degrees to the surface of the workpiece was used. After the first cycle, the test panel was cleaned by blowing compressed air across the top of the sanded panel to remove visible dust. The disc was removed from the back up pad and both the test panel and disc were weighed. Similarly, the bag was also removed from the sander and weighed. The abrasive disk was remounted on the back up pad and the bag was reattached to the sander. The 2nd horizontal sanding cycle was conducted using the same test panel. The test panel was again cleaned by blowing compressed air across the top of the sanded panel to remove visible dust. The abrasive disc was removed from the back up pad and both the test panel and abrasive disc were weighed. Once again, the bag was removed from sander and weighed. The abrasive disk was remounted on the back up pad and the bag was reattached to the sander. After the $2^{nd}$ sanding cycle, the tested panel was placed vertically against the wall and the $3^{rd}$ (now vertical) sanding application was applied to the same test panel with the dust bag aligned vertically and the dust inlet to the bag positioned beneath the body of the bag. The test panel was again cleaned by blowing compressed air across the top of the sanded panel to remove visible dust. The abrasive disc was removed from the back up pad and both the panel and abrasive disc were weighed. Once again, the bag was removed from sander and weighed.

The following measurements were made for each Example tested by this method and reported as an average of two test samples per Example in Table 4 as indicated:

"Cut": weight, in grams, removed from the plastic panel;

"Retain": weight, in grams, of particles collected in the sample bag

"DE %-bag": ratio of the Retain/Cut multiplied by 100 in sample bag.

TABLE 4

Horizontal to Vertical Sanding

| Example | Cut 1 (Hor.) | DE % 1 | Cut 2 (Hor.) | DE % 2 | Cut 3 (Ver.) | DE % 3 | Comments |
|---|---|---|---|---|---|---|---|
| B1 | 20.1 | 92 | 23.09 | 92 | 9.13 | 49 | Very dusty, a lot of dust came out of bag. |
| B2 | 22.61 | 86 | 23.16 | 29 | NA | NA | Dust appeared at end of 1st cut-bag may be full. Poor dust collection was found at 2nd cut. Vertical cut was not tried. |
| B3 with larger bag (7 in × 9 in) | 22.73 | 91 | 24.32 | 71 | 9.55 | 74 | Some dust escaped at end of 1st cut. Dust observed in air and on the panel at 2nd cut. Very dusty and lots of dust dropping at vertical cut. |
| Example 1 | 24.77 | 95 | 23.37 | 86 | 9.22 | 85 | Light dust was observed at end of 2nd cut. Some dust was observed at vertical cut. No dropping at vertical cut. |

As seen in Table 4, Example 1 achieved an 85 percent dust collection efficiency when sanding vertically, which was significantly greater than the comparative examples.

Life Testing of Pressure Fit Between the Adapter and the Coupler

The life of the adapter 32 was tested by cycling the coupler 38 to the adapter up to 500 times and measuring the Air Tightness and Pull Force in lbf of the friction fit. The pull force test method used was the TestWorks MTS Simplified Tensile Test and ASTM standards mechanical properties testing.

TABLE 5

Results of Adapter to Coupler testing

| Cycles or Uses | Air Tightness | Pull Force To Remove Adapter From Coupler | Comments |
|---|---|---|---|
| 0 | Excellent | 47.2 lbf (210 N) | Very good seal |
| 50 | Excellent | 17.33 lbf (77 N) | Held well |
| 500 | Excellent | 14.4 lbf (64 N) | Friction fit held well |

The results show that after 500 uses, the friction fit of the adapter to the coupler remains in tact and strong enough to make the product functional.

Examples 17-19

Examples 17-19 were prepared similarly to Example 1, except prior to folding over, a 1.25" (3.8 cm) diameter hole was die cut in the center of the laminate and a 2 cm diameter × 6.5 cm coupler, as illustrated in FIG. 4, was bonded to the periphery of the hole by ultrasonic welding as described in Welding Process 1. Once the coupler was bonded to the laminate, the layers were folded over to form envelopes similarly to those of Example 1, except that the two long edges and the short edge of the envelope were ultrasonically welded as described in Ultrasonic Welding Process 2. Prior to making the short edge envelope weld, various amounts of fibrous filling material, (polyester staple fiber, "Poly-Fil™ 100% Polyester Non-Allergenic Polyester Fibers", obtained from Fairfield Processing, Danbury, Conn.) were inserted into the envelope. Upon completion of the short edge weld, the resulting bag portion 17 resembled a pillow. Construction details and Gel Coat Sanding Test Method 1 results are shown in Table 6.

TABLE 6

Gel Coat Test Sanding Test

| Example | Outer Support Layer (28) | Second Filter Layer (26) | First Filter Layer (24) | Inner Support Layer (22) | Fibrous fill material, g | Time-minutes at 70% Efficiency |
|---|---|---|---|---|---|---|
| 17 | FM1 | FM4 | FM6 | FM9 | 12.0 | 19.4 |
| 18 | FM1 | FM4 | FM6 | FM9 | 25.0 | 25.5 |
| 19 | FM1 | FM4 | FM6 | FM9 | 50.0 | 26.6 |

Other modifications and variations to the present invention may be practiced by those of ordinary skill in the art, without departing from the spirit and scope of the present invention, which is more particularly set forth in the appended claims. It is understood that aspects of the various embodiments may be interchanged in whole or part or combined with other aspects of the various embodiments. All cited references, patents, or patent applications in the above application for letters patent are herein entirely incorporated by reference in a consistent manner. In the event of inconsistencies or contradictions between the incorporated references and this application, the information in the preceding description shall control. The preceding description in order to enable one of ordinary skill in the art to practice the claimed invention is not to be construed as limiting the scope of the invention, which is defined by the claims and all equivalents thereto.

What is claimed is:

1. A product comprising:
   a dust collection device in fluid communication with a dust exit port of a sanding tool comprising a bag having a sidewall and a coupler attached to the bag;
   the sidewall comprising a first filter layer, a second filter layer, and an outer support layer that is air permeable;
   the first filter layer comprising a plurality of fibers forming a nonwoven web, the first filter layer having a total pressure drop between about 0.1 to about 4.0 mm $H_2O$, and the first filter layer having a total basis weight between about 50 to about 450 gram/m$^2$; and
   the second filter layer comprising a melt blown microfiber nonwoven web, the second filter layer having a total pressure drop between about 5.5 to about 20.0 mm $H_2O$, and the second filter layer having a total basis weight between about 15 to about 75 grams/m$^2$;
   wherein the first filter layer, the second filter layer, and the outer support layer are positioned in a face to face relationship forming a composite sidewall material; and
   the dust collection device comprises a seam on three sides of the bag.

2. The product of claim 1 wherein the first filter layer comprises a plurality of fibrillated electrostatically charged electret fibers having a total pressure drop between about 0.25 to about 2.0 mm $H_2O$.

3. The product of claim 1 wherein the first filter layer comprises a carded polyolefin layer having a total pressure drop between about 0.25 to about 2.0 mm $H_2O$.

4. The product of claim 1 comprising an inner support layer adjacent to the first filter layer and the inner support layer comprising a thermoplastic material.

5. The product of claim 2 comprising the first filter layer having a total basis weight between about 140 to about 200 gram/m$^2$.

6. The product of claim 3 comprising the first filter layer having a total basis weight between about 125 to about 250 gram/m$^2$.

7. The product of claim 5 comprising the second filter layer having a total pressure drop between about 8.0 to about 13.0 mm $H_2O$, and the second filter layer having a total basis weight between about 40 to about 60 grams/m$^2$.

8. The product of claim 6 comprising the second filter layer having a total pressure drop between about 10.0 to about 18.0 mm $H_2O$, and the second filter layer having a total basis weight between about 25 to about 75 grams/m$^2$.

9. The product of claim 1 wherein the coupler comprises a barbed first end, a flange, and a ribbed second end, and the flange is heat welded to the composite sidewall material such that the ribbed second end resides inside of the bag.

10. The product of claim 9 comprising a plurality of gripping ribs projecting outwardly from a radial surface of the ribbed second end of the coupler.

11. The product of claim 1 comprising a total thickness for the first filter layer and the total thickness of the first filter layer is between about 2.5 mm to about 4.5 mm.

12. The product of claim 1 comprising a total thickness for the second filter layer and the total thickness of the second filter layer is between about 0.3 mm to about 1.0 mm.

13. The product of claim 1 comprising a total thickness for the first filter layer and the total thickness of the first filter layer is between about 3.0 mm to about 15.0 mm, and the second filter layer comprising a total thickness and the total thickness of the second filter layer is between about 0.3 mm to about 1.0 mm.

14. The product of claim 1 wherein the second filter layer comprises an electrostatically charged melt blown microfiber nonwoven web.

15. The product of claim 1 wherein the coupler has a second end residing inside the bag and a ratio of a length of the second end to an inside length of the bag is between about 0.25 to about 0.9.

16. The product of claim 1 wherein the coupler has a second end residing inside the bag and the second end includes at least one diffuser orifice located along a length of the second end.

17. The product of claim 1 wherein the coupler has a second end residing inside of the bag and a flexible diffuser is attached to the second end.

18. The product of claim 1 wherein the bag comprises an internal cavity and a lofty filling material is placed into the internal cavity.

19. A kit comprising:
   a dust collection device for a sanding tool comprising a bag having a sidewall and a coupler attached to the bag; the coupler comprising a barbed first end; the sidewall comprising a first filter layer, a second filter layer, and an outer support layer; the first filter layer comprising a plurality of fibers forming a nonwoven web, the first filter layer having a total pressure drop between about 0.1 to about 4.0 mm $H_2O$, and the first filter layer having a total basis weight between about 50 to about 450 gram/m$^2$; the second filter layer comprising a melt blown microfiber nonwoven web, the second filter layer having a total pressure drop between about 5.5 to about 20.0 mm $H_2O$, and the second filter layer having a total basis weight between about 15 to about 75 grams/m$^2$;
   an adapter having a first threaded end and a second internally tapered end; and
   instructions for attaching the first threaded end of the adapter to a dust exit port of the sanding tool and for inserting the barbed first end of the coupler into the second internally tapered end of the adapter.

20. The kit of claim 19 comprising an elastomeric adapter and a rigid plastic coupler.

21. The kit of claim 19 wherein a connection between the second internally tapered end of the adapter and the barbed first end of the coupler is substantially air tight at pressures of 90 psi (620 kPa) or less.

22. The kit of claim 19 wherein the barbed first end comprises an oval cross section shape with two opposing flats and two opposing curved ends and the second internally tapered end comprises a circular cross section.

23. The product of claim 1 wherein the composite sidewall material is folded in half lengthwise and the coupler is attached to the resulting folded side of the bag.

* * * * *

UNITED STATES PATENT AND TRADEMARK OFFICE
CERTIFICATE OF CORRECTION

PATENT NO. : 8,070,862 B2
APPLICATION NO. : 12/180712
DATED : December 6, 2011
INVENTOR(S) : Woo et al.

It is certified that error appears in the above-identified patent and that said Letters Patent is hereby corrected as shown below:

On the Title Page of the Title Pages, in Column 2, Item (57) (Abstract)
Lines 11-12, before "5.5" delete "between about".

Drawing (FIG. 5), on the (Y-axis)
Delete "efficinecy" and insert -- efficiency --, therefor.

Column 5
Line 56, delete "Feluharty," and insert -- Fluharty, --, therefor.

Column 12
Line 62, delete ""PN 49973"as" and insert -- "PN 49973" as --, therefor.

Column 13
Line 16, delete "Material" and insert -- material --, therefor.

Column 18
Line 65, delete "bag" and insert -- bag; --, therefor.

Column 19
Line 58, delete "in tact" and insert -- intact --, therefor.

Signed and Sealed this
First Day of May, 2012

David J. Kappos
*Director of the United States Patent and Trademark Office*